US009628530B2

(12) United States Patent
Jaynes

(10) Patent No.: US 9,628,530 B2
(45) Date of Patent: Apr. 18, 2017

(54) SYSTEM AND METHOD FOR MODERATED AND ON-DEMAND VISUAL FILE DISTRIBUTION

(71) Applicant: Mersive Technologies, Inc., Denver, CO (US)

(72) Inventor: Christopher O. Jaynes, Denver, CO (US)

(73) Assignee: Mersive Technologies, Inc., Denver, CO (US)

( * ) Notice: Subject to any disclaimer, the term of this patent is extended or adjusted under 35 U.S.C. 154(b) by 128 days.

(21) Appl. No.: 14/630,515

(22) Filed: Feb. 24, 2015

(65) Prior Publication Data

US 2016/0248830 A1 Aug. 25, 2016

(51) Int. Cl.
*H04L 29/06* (2006.01)
*G06Q 10/10* (2012.01)

(52) U.S. Cl.
CPC ......... *H04L 65/4084* (2013.01); *G06Q 10/10* (2013.01); *H04L 63/08* (2013.01); *H04L 63/10* (2013.01); *H04L 67/42* (2013.01)

(58) Field of Classification Search
CPC ..... H04L 65/4084; H04L 67/42; H04L 63/10; H04L 63/08; G06Q 10/10
See application file for complete search history.

(56) References Cited

U.S. PATENT DOCUMENTS

| | | | | |
|---|---|---|---|---|
| 9,020,992 B1* | 4/2015 | Gunda | ............... | G06F 12/0815 707/827 |
| 2002/0099944 A1* | 7/2002 | Bowlin | ............... | G06F 21/6218 713/185 |
| 2010/0154038 A1* | 6/2010 | Natarajan | ............... | H04L 63/08 726/5 |
| 2011/0078197 A1* | 3/2011 | Zurko | ............... | G06F 17/30165 707/783 |
| 2012/0314018 A1 | 12/2012 | Wengrovitz et al. | | |
| 2013/0046833 A1* | 2/2013 | Riepling | ............... | H04L 67/06 709/206 |
| 2013/0246932 A1* | 9/2013 | Zaveri | ............... | G06F 3/017 715/740 |
| 2014/0059344 A1* | 2/2014 | Branton | ............... | G06F 21/10 713/165 |
| 2014/0137273 A1* | 5/2014 | Workman | ............... | G06F 21/6218 726/32 |

(Continued)

OTHER PUBLICATIONS

Extended European Search Report in European Patent Application No. 16157233.4 mailed May 19, 2016, 8 pages.

(Continued)

*Primary Examiner* — Abdullahi E Salad
(74) *Attorney, Agent, or Firm* — Lathrop Gage LLP

(57) ABSTRACT

A media file exchange system that supports group collaboration sessions in which media files are being shared with one or more participants. The system augments real-time media collaboration where one or more users have shared media to a group collaboration session. The system allows participants in the collaboration group to indicate their desire to share a media file to one, a few, or an entire group. The media file to be shared and a specific one of the receiving user devices are selected on a participants device other than the device owning the media. The system automatically moderates the exchange of the information between the participants.

30 Claims, 6 Drawing Sheets

(56) References Cited

U.S. PATENT DOCUMENTS

| | | |
|---|---|---|
| 2014/0165176 A1 | 6/2014 | Ow |
| 2014/0240445 A1 | 8/2014 | Jaynes |
| 2014/0267577 A1 | 9/2014 | Weber et al. |
| 2015/0200945 A1* | 7/2015 | Edson .................... G06F 21/62 726/28 |

OTHER PUBLICATIONS

International Search Report and Written Opinion corresponding to International Patent Application No. PCT/US2016/044581, mailed Oct. 20, 2016, 7 pages.

* cited by examiner

SYSTEM AND METHOD FOR MODERATED AND ON-DEMAND VISUAL FILE DISTRIBUTION

BACKGROUND

Problems to be Solved

Traditional media file distribution involves a sender, one or more receivers, and a transport mechanism. Previous systems designed to transmit a file from a sender to one or more receivers require the sender to identify the media file to be sent, identify the receivers, and then initiate a copy of that media file through a user interface.

These traditional systems are embedded in many current embodiments, including sharing images and video via email attachments, sharing media files through online "shared folders" and other group access mechanisms. While sufficient for sharing a media file from one sender to potentially many receivers—these systems are limited in a number of ways:

First of all, they assume that the sender is the owner or has permission to share the media file to be sent. Therefore, they are not appropriate for situations when a sender is, in fact, not the owner of the media file.

Traditional systems further assume that the senders and receivers are identified outside of the context of the sending system. That is, the sender/receivers have been independently identified and authenticated (through an email address or some other identifier). In situations where users are not authenticated independently, sending media files in this way may not be possible.

In addition, previous systems do not support ad hoc or on-demand authentication in real-time, nor do they support direct and on-demand authentication of media file transmission.

Solution/Summary

A media file exchange system is disclosed that supports group collaboration sessions in which media files are being shared with one or more participants. The system augments real-time media collaboration where one or more users have shared media to a group working session. The system allows members of the collaboration group to indicate their desire to share a media file to one, a few, or an entire group. The system then automatically moderates the exchange of the information between the participants. Because group collaboration systems encourage individuals to view, and potentially work with one another's data, the system supports media exchange in an ad-hoc manner so that individuals can trigger a media file exchange from any owner to any receiver in the collaboration group. In some cases the sender does not have to be the owner of the media.

In this way, media file exchange becomes an ad-hoc and supportive action of a larger, and potentially dynamic collaboration that is underway. In addition, the sender of the media may be someone other than the owner, creating new collaborative workflows in which senders can request/send media that they do not own. Once a visual representation of a media element enters the collaborative workspace it is a candidate for sharing from any one user to any set of receivers.

DETAILED DESCRIPTION

Figure 1:
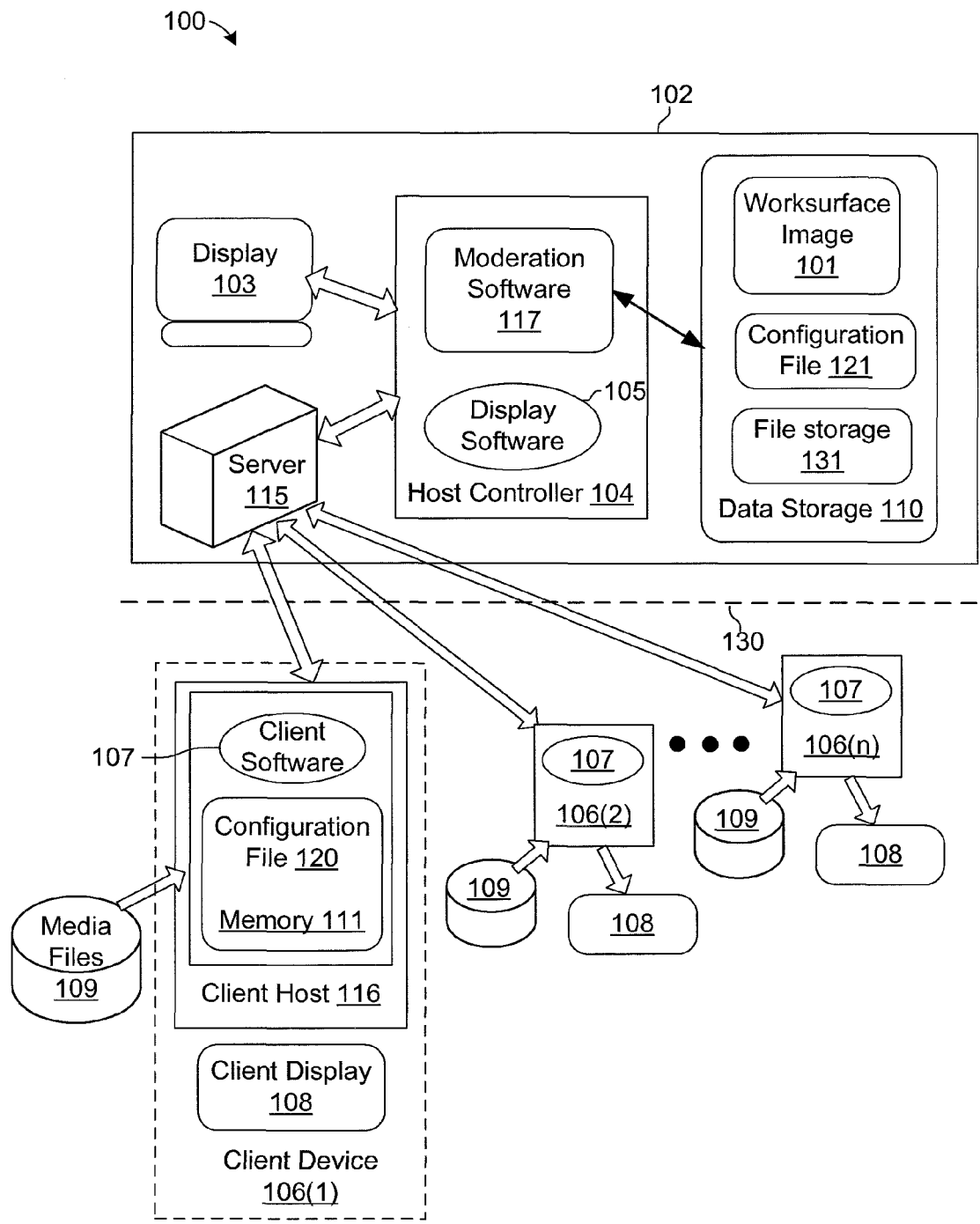
FIG. 1 is a diagram illustrating exemplary components of the present system.

The present method and system is built around a central worksurface that is used to collaboratively visualize various media files contributed by one or more participants. FIG. 1 shows exemplary components of the present system 100, which comprises a host computer system 102 and two or more client display devices 106(*) [where the "*" is a wild card indicating a specific device] which communicate with system 102 via a network 130 such as the Internet. In an exemplary embodiment, host system 102 includes host controller (digital processor) 104, associated data storage 110, and server 115. Host controller 104, coupled to server 115, executes moderation software 117 to provide the collaboration and moderation functionality described herein. Data storage 110 is used for storing data including a worksurface image 101, and a configuration file 121, used for storing user file access permission information. An optional host computer display 102 may be included in system 102. In some cases users may view a single host computer display together for a shared view.

A client software application 107, resident in each client device 106, performs tasks including handling and formatting information received from system 102, and sending control information to the system (as described in detail below). Client software application 107 is the same application that allows users to initiate a file transfer. Application 107 receives and 'assembles' an image of the current work surface 101 on each respective client device 106. For example, the application allows a user to see all the posts that have been shared and the set of connected users, via user interface 101(U). This information may optionally be replicated on the main display. When a user selects a media element and drags it to a user icon 201(*) to initiate sending the selected file to the selected user, the process is performed by the same software (application 107) that receives the 'state' of the system from system 102 and displays it via user interface 101(U). Note that the images shown via the user interface are not copies of the source file.

Shared worksurface 101 is an image, generated by moderation software 117 and stored in host controller data storage 110, which depicts the position, scale and content of different media files/streams with respect to one another in a graphical format. The shared worksurface 101 may be viewed by each user on any type of visual display 108 (or 103), for example, a computer screen, a tablet computer, a smart phone screen, etc. Media presented in the shared worksurface can be videos, images, live camera feeds, or other sources capable of being visualized. The graphical representation of a shared visual media element is hereinafter referred to as a "post".

Note that there is a distinction between a media "post" (the visual representation/video of a file) and the corresponding data "file" itself, that is used to generate the visual representation. In some cases the corresponding post is the file, for example, in the case of a still image, such as a photograph. In other cases the post is not the same entity as the corresponding file, for example, when a live view of a text document is being streamed so that the image of the document is being sent.

By way of example, if a user, operating a client device 106 uses the client application 107 to select and share a word processing application to Server 115, the client application captures the visual state (image) of the word processing application and encodes the image as a video. A series of images/video are transmitted to system 102 where they are then decoded and displayed as part of the worksurface image 101. This live video of the word processing application is different than the datafile that the word processing application is currently displaying. When the transfer of a selected source media file is initiated by a user, a post identifier indicating the identity of the selected post is transmitted to its appropriate owner. The owner of the post must translate the post identifier into the corresponding data file. In some cases, e.g., where the post is a still image, then the post identifier is sufficient and this additional lookup is not required.

In operation, two or more users, each using a client device 106, establish a connection to a particular session by logging in, for example, to server 115, or via any other authentication mechanism. Once a user has joined a session, they are able to perform actions including posting a source media file 109 to the shared worksurface 101, deleting media files from the worksurface, and repositioning/scaling media posts. In a typical use case, several users may connect to the shared worksurface and share a view of their PC desktops, as well as a set of image/video files, or other visual data such as the output of applications running on the PC. The group of users can then visualize the a shared worksurface that contains information from a variety of sources. This shared worksurface can be presented on client displays 106 or on a separate display connected to the host computer system.

Although a representation of the connected client devices may be stored on a worksurface such as worksurface 101 in the file transfer system, the representation in the present system is not required to be either an image or on a worksurface—for example, the representation can simply be connection information that denotes who is connected and what has been shared by each connected user. Each client device can then build its own worksurface from the connection information, using client software application 107.

Although each source media file 109 may be shared to/by the users during a collaborative session, the source data behind each media file 109 is not automatically exchanged. For example, if a user shares a PDF document to the display, he/she is sharing the visual output of that PDF as it is displayed and controlled. The image of the data is different than the data itself. A recipient user could not reconstruct a PDF file from a live video (pixel data) of the PDF. As another example, after a user shares two video clips, several users may join the session and to view and discuss the two clips, using the collaborative worksurface. However, if a user would like to retrieve one of the source video files that corresponds to one of the shared clips a new mechanism is required. Previous mechanisms also do not support the case where a connected user who is not the owner of either file would like to transfer a source video file to a second user. With the present method, a user may initiate a file transfer between two other users. That is, the file may be 'pushed' between a file owner and a receiver, neither of which are the user who initiated the file transfer. The present system thus also provides a novel mechanism for initiating and moderating a media file exchange in such an environment.

Figure 2:
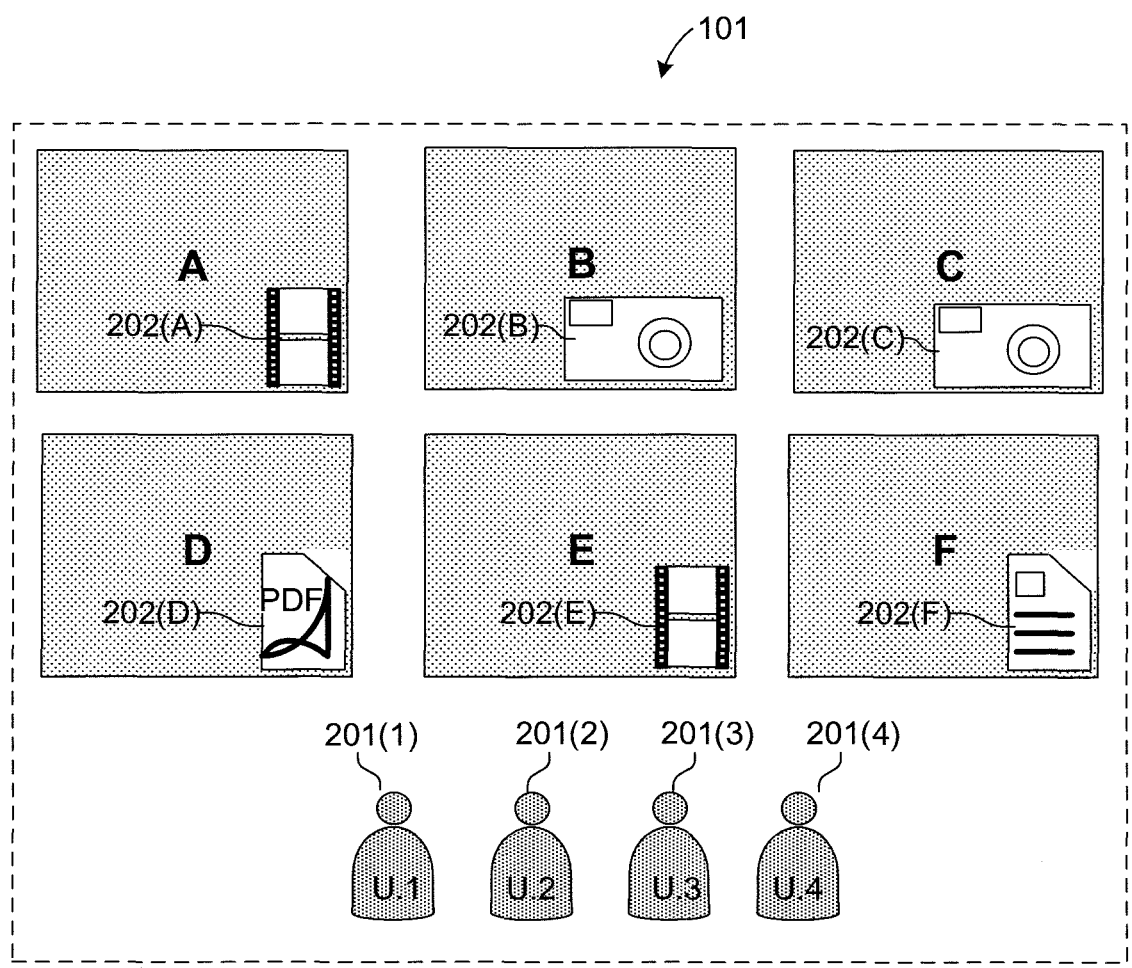
FIGS. 2, 3, and 4 illustrate an example wherein when four users are connected to the present system and collaborating, with multiple source media files being shared.
Figure 3:
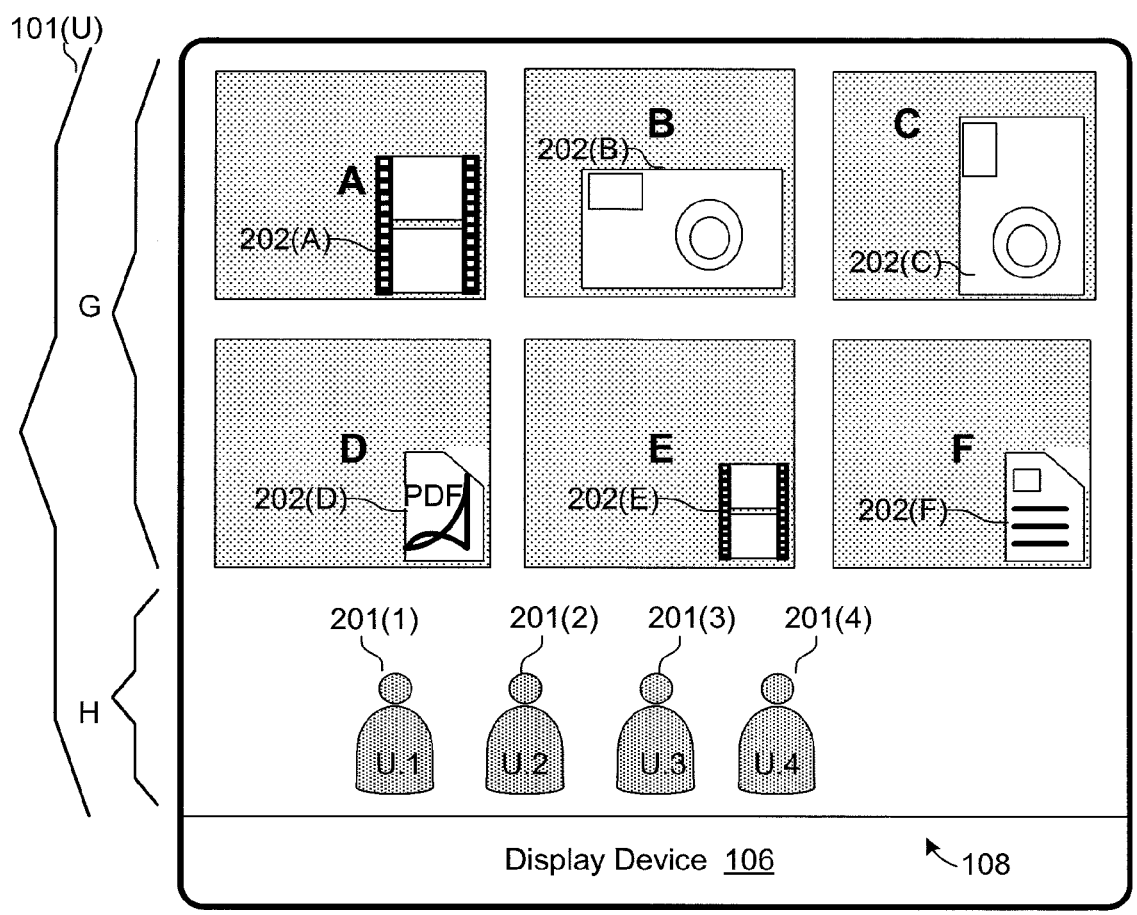
Figure 4:
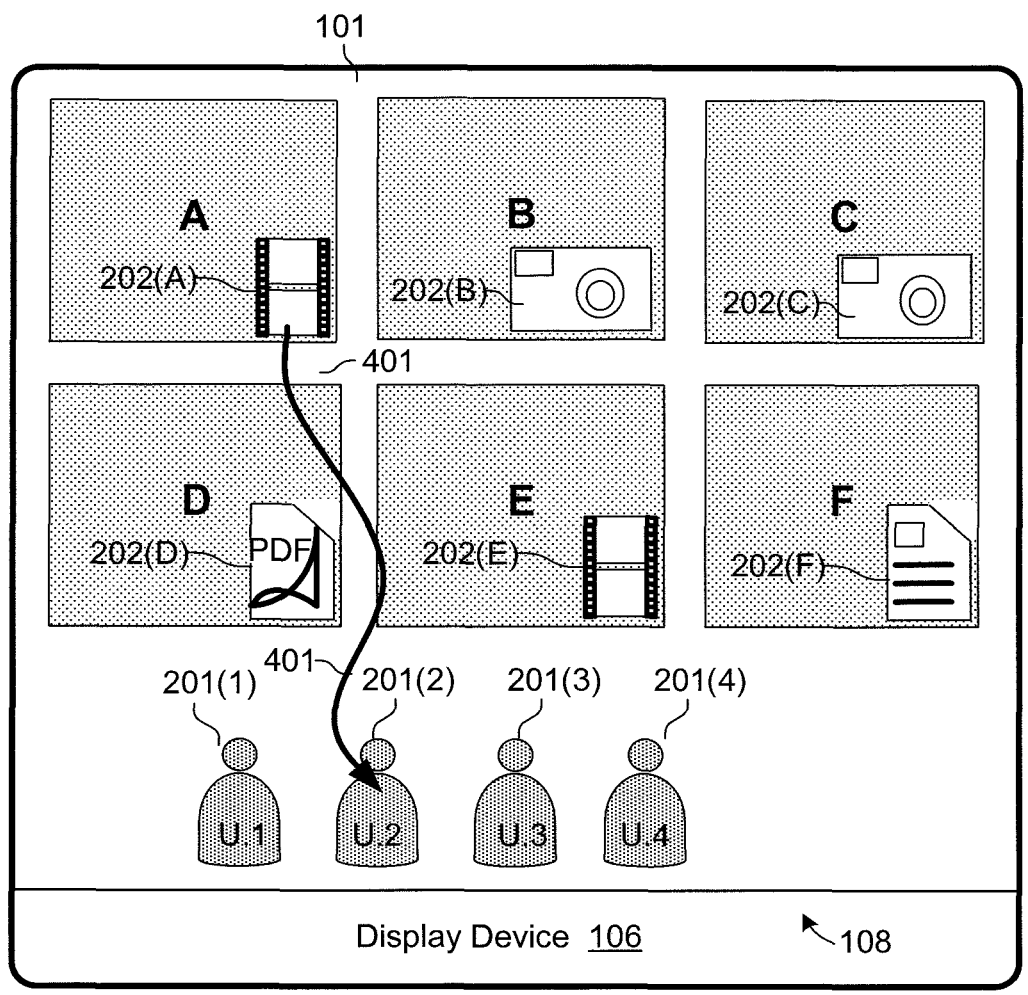

FIGS. 2-4 illustrate an example wherein when four users have logged in (for example, to server 115) to establish a connection to the present system, and are engaged in a collaborative session, with six media source media files (or streams) 109 A-F [depicted as elements 202(A)-202(F)] being shared in FIG. 2 shows the corresponding image of shared worksurface 101 stored in host controller data storage 110, which is sent, via server 115, to each client (user) device 106 that is logged in to a particular session. Worksurface 101 is displayed on each connected user's client display screen 108, showing media elements 202(A)-202(F) being posted in respective posts A-F, and four users 201(1)-201(4) currently connected to the session, as indicated by user icons 201(1)-201(4).

As shown in FIG. 3, shared worksurface 101 is presented through a user interface (G) on client device 106 that denotes the relative position on the display and scale. Size, at least relatively, may be denoted by the size of the post, on the shared worksurface, of each media element 202 currently shared to the group of users. Note that in FIG. 3, all posts are not the same size and/or aspect ratio—for example, posts A and E are both video media (as indicated by the movie film icons), but post A is visually indicated as being larger in size than post E. In addition, although posts B and C are both single frame ("still") images (e.g., photographs), the relative aspect ratios and/or orientations of the two posts can be readily observed from the relative aspect ratios/orientations thereof on each user's display 108.

Media elements 202(A)-202(F) are typically video recordings ("videos") of the changing visual elements representing various source media files 109 that have been published to the worksurface 101(U) of a client device 106, representing a potential variety of media types including videos, images, live video streams, PDF documents, etc. For example, a post my be an application window on a client device user's desktop that is changing and is presented as a video stream on the user's display 108. When a still image is shared, then the posts are static images.

Media elements 202 can be visually augmented to denote the source datatype that the post represents, or the owner of the source file corresponding to that post.

A graphical representation of users area (H) is used to denote user connections and optionally, their status. In the present example, individual user icons **201(*)** are shown with labels U.1-U.4, representing the four users that are logged in to the present collaborative session. The user icons help to support intuitive file transfer from a source to a target user.

In the present example, assume that media element 202(A) has been shared by user U.1. In this example, user U.2 decides that user U.4 should receive a copy of element 202(A). That is, the owner in this case is U.1, the sender is U.2 and the receiver is U.4. U.2 initiates a media file transfer by graphically selecting the element to be shared and dragging it on the interactive interface to the user icon that represents U.4, as indicated by arrow 401 in FIG. 4. Note the user who initiates the share does not necessarily need to know the identity of the original file owner. Another example of initiating a transfer includes simply selecting the element to be shared from a list of currently shared posts and subsequently selecting the receiver from a list of currently connected users.

Next, moderation software 117 moderates the transaction by executing a set of moderation steps. Both sender and receiver must grant permission for a source media file 109 exchange either implicitly or explicitly. This step is important because the system supports the novel use case in which a user who is potentially neither the owner or the receiver of the media can initiate the exchange. In the implicit case, senders and receivers can acknowledge ahead of time that they are willing to participate in file exchanges. Implicit permissions may be stored in a configuration file 120 on a user's device and then transmitted to system 102 and stored in configuration file 121 when that user initiates a connection. These permissions can be global allowing a user to share and accept shared files a priori. Permissions may also include only partial permissions based on the type of file being exchanged, the user who initiates the share, the owner (or class) of the media to be exchanged, or the user (or user class) who may receive the file. Note that permissions may indicate when a user can share as well as when a user can receive a share.

If implicit permission does not exist, or implicit permissions to not apply to the initiated exchange, then an explicit permission step is required for both the owner and the receiver, to capture that implicit permissions may exist but which fail because a particular type or class of permission is not covered. Explicit permission moderation takes place at the time of a share event and is controlled by data stored in the sharing system configuration file 121.

Figure 5A:
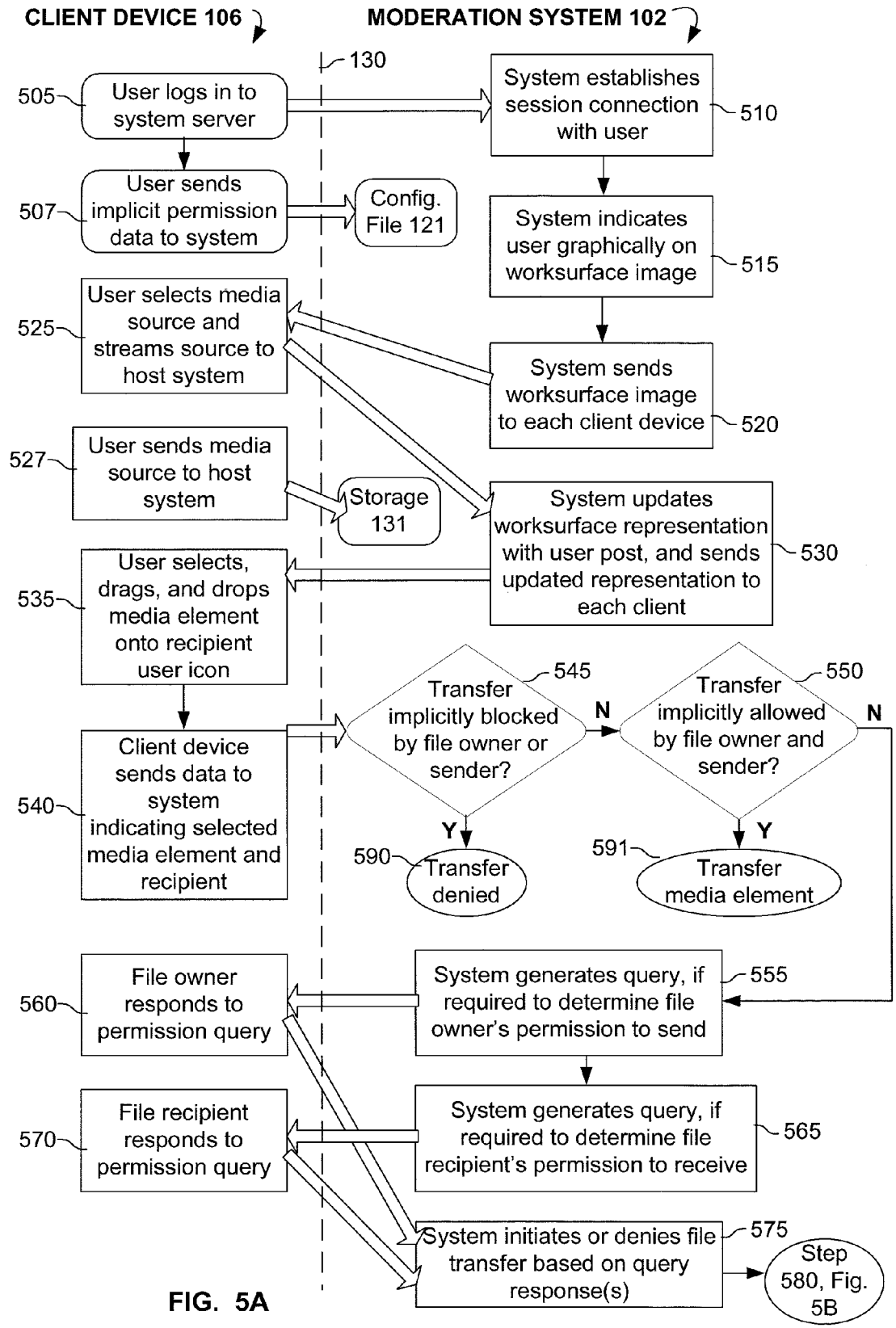
FIGS. 5A and 5B illustrate an exemplary set of steps performed in a collaborative session moderated by the present method, and corresponding data flow between the host computer and client devices.
Figure 5B:
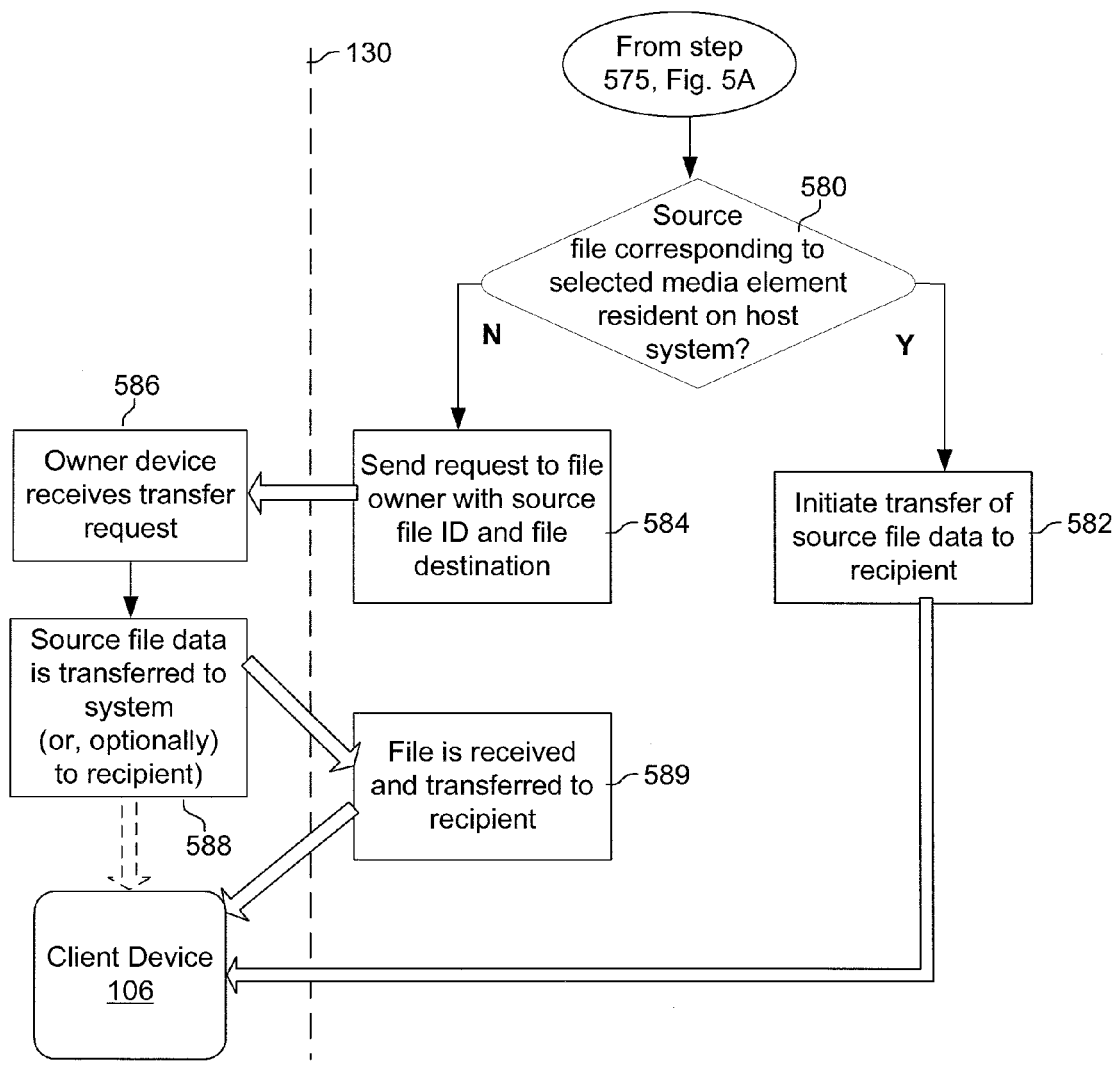

FIGS. 5A and 5B illustrate an exemplary set of steps performed in a collaborative session moderated by the present method, and corresponding data flow between system 102 and client devices 106.

Sharing Media Elements Via the Worksurface

As shown in FIG. 5A, a typical exchange of files sharing media elements 202 to a screen via the present method is initiated at step 505, wherein user U.1 [represented by icon 201(1)] logs in to server 115.

At step 510, host system 102 establishes a session connection for user U.1. At this point, a user may (at step 507) transmit implicit permissions, stored in configuration file 120 on the user's device, to system 102, where they are stored in configuration file 121.

At step 515, system 102 then indicates user U.1 graphically on shared worksurface image 101 (as shown by icon 201(1) in FIG. 2) and sends the worksurface image information to each presently-connected client device 106, at step 520, as shown in FIG. 3. More specifically, this worksurface image information may include the set of connected users and the media posts that each has shared, the position and scale of each media post currently in view, and the type (e.g., text document, video file) of each media post's corresponding datafile, etc.

Next, at step 525, user U.1 selects media source (file) 202(A) from media file storage 109 and streams the media source file to system 102, which denotes the media on shared worksurface image 101 (in post A). For example the stream may be the actual file (e.g., a stream of the bytes of the PDF file, or a picture) or simply a video that is the current visual representation of the data file.

Optionally, at step 527, the source file owner, e.g., user U.1, sends the source media file (the actual file data, rather than a video stream or other representation of the actual source data) to system 102. The system stores the received information in file storage area 131 and then updates worksurface representation 101 and then sends the updated representation to each client device connected to the present session, at step 530. Note that the media source file 202 can be a live visual representation of a file, or the file data itself.

User U.1 may then share (stream) a second media file, e.g., file 202(B), to system 102, per steps 525 and 530. System 102 then sends the media file information to each client device, which then uses software application [107] to format the information on each user's shared worksurface. In the present example, user Users U.2, U.3, and U.4 also connect to system 102, which then denotes the users graphically on shared worksurface 101, per steps 505-520. User U.3 then shares one or more additional media files to the system [e.g., files 202(C)-202(F)], and the system denotes the shared media files on the displayed shared worksurface 101(U), per steps 525 and 530.

Initiating a Share Event

In the present example, assume that user U.3 would like to share media element 202(A) with user U.2. In this case, user U.3 interacts with the visualized shared worksurface 101(U) on the user's client device 106 to select the selected graphic media element 202(A), and then and drags and drops the selected element onto the graphical representation of recipient user U.2 [icon 201(2)], as shown by arrow 401 in FIG. 4, at step 535. At step 540, the user's client device 106 sends system 102 control information indicating the selected media element 202 and the recipient of the element. When control information about media input events is transmitted to system 102, the system implements the changes on worksurface 101 (e.g., adds media, deletes media, scales, repositions, etc.). The system then sends updated image to connected client devices 106.

Moderating a Share Event

At step 545, system 102 checks configuration file 121 to see if either the media file owner (user U.1) or the potential media file recipient (user U.2) has implicitly blocked permission to respectively share (transfer) or receive selected media element 202(A). If permission has been blocked by either user, then the file transfer is denied, at step 590.

At step 550, system 102 checks configuration file 121 to see if file-owning user (user U.1) and potential media file recipient (user U.2) have both implicitly granted permission to receive element 202(A), based on various aspects of the media. For example, a client device may indicate that it accepts all media files that are less than 10 Megabytes in size (filesize). Or the client device may only accept media that is of type PDF (type/class), or may accept only media that was created after a certain date (obtained from metadata about the file creation), or media that is encrypted a certain way. If both the owning user and the potential recipient have granted implicit permission to send/receive the selected media file, then the file transfer from file owner U.1 to recipient U.2 is initiated, at step 591.

At step 555, system 102 determines whether a query is necessary to determine whether the file-owning user's permission is explicitly required If the state of owning user U.1's implicit permissions (stored in file 121) neither indicate an applicable implicit permission to send the selected media file [element 102(A)] in question, nor an implicit indication that files are to blocked, the system generates a 'file transmit permission' query, sent to, and displayed on, owning user's (U.1's) client device display 108. Permissions may be related to classes of media types (see above), the owner of the media, or who is requesting the transfer, etc.

The file transmit permission query seeks permission to share (transmit) media file 202(A). This query may request the file name and type, information about the user who as initiated the share, as well as information about the target of the share. It may also include a graphical representation of the media to be shared, which provides the ability to 'live preview' the file before a user accepts it, which will help prevent users from accepting nefarious/malicious content. The file-owning user (U.1) then responds to the file transmit permission query, at step 560, indicating whether permission to transfer the selected media file is granted or not.

At step 565, if the state of the implicit permissions from potential media file recipient U.2 neither indicate an applicable implicit permission to allow receipt of the selected media file, nor an implicit indication that files are to blocked, the system generates a 'file receive permission' query, sent to, and displayed on, user U.2's client device display 108. The query seeks permission to receive element 202(A). This query may denote the file name and type, information about the user who as initiated the share, as well as information about the owner of the media element 202(A). It may also include a graphical representation of the media to be shared. The potential media file recipient (user U.2) then responds to the file receive permission query, at step 570, indicating whether permission to receive the selected media file is granted or not.

If it is determined that the necessary implicit or explicit permissions are granted for the requested file transfer, the selected media file will then be copied from the owner's device [106(1)] and transferred to the recipient's device [106(2)], at step 575.

As shown in FIG. 5B, at step 580, host system 102 determines whether the source file corresponding to the selected media element 202(*) is resident on the system (stored in file storage area 131). If the corresponding source file is located, then it is sent to the selected recipient client device 106(*), at step 582. If the corresponding source file is not stored in system 102, then a request for the selected source file is sent to the file-owning client device 106(*), at step 584. At step 586, the file owner receives the request, and, in one embodiment, transfers the source file to system 102, at step 588, and the source file is then transferred to the recipient client device 106 at step 589. In an alternative embodiment, in step 588, the source file is sent directly from the file owner's client device 106(*) to the recipient's device 106(*), as shown by the dotted arrow in FIG. 5B.

The above description of certain embodiments of the invention is not intended to be exhaustive or to limit the invention to the precise forms disclosed. The terms used in the claims should not be construed to limit the invention to the specific embodiments disclosed in the specification, rather, the scope of the invention is to be determined by the following claims.

What is claimed is:

1. A method for moderating transmission of a media source file from a media source owner computer to a receiving computer, the method comprising:
    wirelessly connecting at least three client devices to a host system having a shared display, wherein one of the client devices is the media source owner computer, another of the client devices is the receiving computer, and another of the client devices is a sender computer;
    receiving, from the media source owner computer at the host system, a visual representation of the media source file;
    displaying the visual representation on the shared display as a worksurface image;
    sending, from the host system, to each of the connected client devices, worksurface image information including position of each shared visual representation in the worksurface image;
    receiving, at the host system and from the sender computer, control information indicating to share the media source from the owner computer to a recipient, the control information based on interaction with the visual representation of the media source file within the worksurface image on the sender computer, the recipient being the receiving computer;
    verifying permission to transmit the media source file and permission to receive the media source file by:
        receiving permission information pertaining to the media source owner computer and to the receiving computer;
        examining the received permission information to determine whether the information is sufficient to authenticate permission from the media source owner computer and from the receiving computer; and
        if there is sufficient stored information to authenticate said permission, then transmitting, from the host system to the media source owner computer, a request to send the selected media source file from the file transfer system to the receiving computer.

2. The method of claim 1, wherein there is insufficient stored information to authenticate said permission, and wherein the permission to transmit and the permission to receive the media source file is further determined by:
    requesting permission from the media source owner computer to transmit the media source file to the receiving computer, via a first dialog between the host system and the media source owner computer;
    requesting permission from the receiving computer to receive the media source file, via a second dialog between the host system and the receiving computer; and
    if both of the first and second dialogs indicate that the respective computer has granted the requested permission, then transmitting the media source file from the host system to the receiving computer.

3. The method of claim 2, wherein the first dialog includes a file transmit permission query seeking permission to transmit the media source file, and the second dialog includes a file receive permission query seeking permission to receive the media source file.

4. The method of claim 1, wherein permission to transmit the media source file and permission to receive the media source file are determined by the host system in accordance with permission information transmitted from the media source owner computer and the receiving computer, respectively, to the host system.

5. The method of claim 4, wherein the permission information includes information about the media source file including file type.

6. The method of claim 4, wherein the permission information includes information about the user of the media source owner computer, and information about the receiving computer.

7. The method of claim 1, wherein, if both of the first and second dialogs indicate that the respective computer has granted the requested permission, then the request indicates that media source file is to be sent from the media source owner computer directly to the receiving computer.

8. The method of claim 1, further comprising reproducing the worksurface image on the sender device;
    wherein the control information is initiated by the sender computer based on a user of the sender computer dragging and dropping a graphic media element representing the media source file onto a graphical representation of a user of the receiving computer within a worksurface image displayed on the sender computer.

9. A method for moderating transmission of a media source file from a media source owner computer to a receiving computer, the method comprising:
    wirelessly connecting at least three client devices to a host system having a shared display, wherein one of the client devices is the media source owner computer, another of the client devices is the receiving computer, and another of the client devices is a sender computer;

receiving, from the media source owner computer at the host system, a visual representation of the media source file;

displaying the visual representation on the shared display as a worksurface image;

sending, from the host system, to each of the connected client devices, worksurface image information including position of each shared visual representation in the worksurface image;

receiving (540), at the host system and from the sender computer, control information indicating to share the media source from the owner computer to a recipient, the control information based on interaction (535) with the visual representation of the media source file within the worksurface image on the sender computer, the recipient being the receiving computer;

verifying permission to transmit the media source file and permission to receive the media source file by:

requesting permission from the media source owner computer to transmit the media source file to the receiving computer, via a first dialog between the host system and the media source owner computer;

requesting permission from the receiving computer to receive the media source file, via a second dialog between the host system and the receiving computer; and if both of the first and second dialogs indicate that the respective computer has granted the requested permission, then transmitting, from the host system to the media source owner computer, a request to send the media source file from the media source owner computer to the host system for relay to the receiving computer.

10. The method of claim 9, wherein the first dialog includes a file transmit permission query seeking permission to transmit the media source file, and the second dialog includes a file receive permission query seeking permission to receive the media source file.

11. The method of claim 9, wherein permission to transmit the media source file and permission to receive the media source file are determined by the host system in accordance with permission information transmitted from the media source owner computer and the receiving computer, respectively, to the host system.

12. The method of claim 11, wherein the permission information includes information about the media source file including file type.

13. The method of claim 11, wherein the permission information includes information about the user of the media source owner computer, and information about the user of the receiving computer.

14. The method of claim 9, wherein, if both of the first and second dialogs indicate that the respective computer has granted the requested permission, then the request indicates that media source file is to be sent from the media source owner computer directly to the receiving computer.

15. The method of claim 9, further comprising reproducing the worksurface image on the sender device;

wherein the control information is initiated by the sender computer based on a user of the sender computer dragging and dropping a graphic media element representing the media source file onto a graphical representation of a user of the receiving computer within a worksurface image displayed on the sender computer.

16. A method for moderating transmission of a media source file from a media source owner computer to a receiving computer, the method comprising:

wirelessly connecting at least three client devices to a host system having a shared display, wherein one of the client devices is the media source owner computer, another of the client devices is the receiving computer, and another of the client devices is a sender computer;

receiving, from the media source owner computer at the host system, a visual representation of the media source file;

displaying the visual representation on the shared display as a worksurface image;

sending, from the host system, to each of the connected client devices, worksurface image information including position of each shared visual representation in the worksurface image;

receiving, at the host system and from the sender computer, control information indicating to share the media source from the owner computer to a recipient, the control information based on interaction with the visual representation of the media source file within the worksurface image on the sender computer, the recipient being the receiving computer;

verifying permission to transmit the media source file and permission to receive the media source file by:

receiving permission information pertaining to the user of the media source owner computer and to the user of the receiving computer;

examining the received permission information to determine whether the information is sufficient to authenticate permission from the media source owner computer and from the receiving computer; and if there is sufficient stored information to authenticate said permission, then transmitting, from the host system to the media source owner computer, a request to send the media source file from the media source owner computer to the receiving computer.

17. The method of claim 16, wherein there is insufficient stored information to authenticate said permission, and wherein the permission to transmit and the permission to receive the media source file is further determined by:

requesting permission from the media source owner computer to transmit the media source file to the receiving computer, via a first dialog between the host system and the media source owner computer;

requesting permission from the receiving computer to receive the media source file, via a second dialog between the host system and the receiving computer; and if both of the first and second dialogs indicate that the respective computer has granted the requested permission, then transmitting the media source file from the host system to the receiving computer.

18. The method of claim 17, wherein the first dialog includes a file transmit permission query seeking permission to transmit the media source file, and the second dialog includes a file receive permission query seeking permission to receive the media source file.

19. The method of claim 16, wherein the permission to transmit the media source file and permission to receive the media source file is determined by the host system in accordance with permission information transmitted from the media source owner computer and the receiving computer, respectively, to the host system.

20. The method of claim 19, wherein the permission information includes information about the media source file including file type.

21. The method of claim 20, wherein the permission information includes information about the user of the media source owner computer, and information about the user of the receiving computer.

22. The method of claim 16, further comprising reproducing the worksurface image on the sender device;
wherein the control information is initiated by the sender computer based on a user of the sender computer dragging and dropping a graphic media element representing the media source file onto a graphical representation of a user of the receiving computer within a worksurface image displayed on the sender computer.

23. A method for moderating transmission of a media source file from a media source owner computer to a receiving computer, the method comprising:
wirelessly connecting at least three client devices to a host system having a shared display, wherein one of the client devices is the media source owner computer, another of the client devices is the receiving computer, and another of the client devices is a sender computer;
receiving, from the media source owner computer at the host system, a visual representation of the media source file;
displaying the visual representation on the shared display as a worksurface image;
sending, from the host system, to each of the connected client devices, worksurface image information including position of each shared visual representation in the worksurface image;
receiving, at the host system and from the sender computer, control information indicating to share the media source from the owner computer to a recipient, the control information based on interaction with the visual representation of the media source file within the worksurface image on the sender computer, the recipient being the receiving computer;
verifying permission to transmit the media source file and permission to receive the media source file by:
requesting permission from the media source owner computer to transmit the media source file to the receiving computer, via a first dialog between the host system and the media source owner computer;
requesting permission from the receiving computer to receive the media source file, via a second dialog between the f host system and the receiving computer; and
if both of the first and second dialogs indicate that the respective computer has granted the requested permission, then transmitting, from the host system to the media source owner computer, a request to send the media source file directly from the media source owner computer to the receiving computer.

24. The method of claim 23, wherein the first dialog includes a file transmit permission query seeking permission to transmit the media source file, and the second dialog includes a file receive permission query seeking permission to receive the media source file.

25. The method of claim 23, wherein permission to transmit the media source file and permission to receive the media source file are determined by the host system in accordance with permission information transmitted from the media source owner computer and the receiving computer, respectively, to the host system.

26. The method of claim 25, wherein the permission information includes information about the media source file including file type.

27. The method of claim 25, wherein the permission information includes information about the user of the media source owner computer, and information about the user of the receiving computer.

28. The method of claim 23, wherein, if both of the first and second dialogs indicate that the respective user has granted the requested permission, then the media source file is sent from the media source owner computer directly to the receiving computer.

29. The method of claim 23, wherein the request includes a graphical representation of the media to be shared, providing a live preview of the media source file before the user accepts the source file.

30. The method of claim 23, further comprising reproducing the worksurface image on the sender device;
wherein the control information is initiated by the sender computer based on a user of the sender computer dragging and dropping a graphic media element representing the media source file onto a graphical representation of a user of the receiving computer within a worksurface image displayed on the sender computer.

* * * * *